United States Patent [19]

Graber

[11] Patent Number: 4,875,608

[45] Date of Patent: Oct. 24, 1989

[54] VEHICLE MOUNTED FOLDABLE BICYCLE CARRIER

[75] Inventor: John W. Graber, Stoughton, Wis.

[73] Assignee: Graber Products, Inc., Madison, Wis.

[21] Appl. No.: 209,363

[22] Filed: Jun. 21, 1988

[51] Int. Cl.[4] .............................................. B60R 9/10
[52] U.S. Cl. ............................. 224/42.03 B; 224/42.08
[58] Field of Search ................. 224/42.03 A, 42.03 B, 224/42.03 R, 42.07, 42.08, 42.43, 42.45 R, 309, 310, 314, 315, 316, 317, 318, 319, 320, 321, 324; 414/462; 211/17, 18, 19, 20, 21, 22, 23, 5; 280/502

[56] References Cited

U.S. PATENT DOCUMENTS

| | | | |
|---|---|---|---|
| 1,506,274 | 8/1924 | Specht | 224/42.03 R |
| 3,251,520 | 5/1966 | Van Dyke et al. | 224/42.03 R |
| 3,348,713 | 10/1967 | Will | 414/462 |
| 3,528,578 | 9/1970 | Schoenberger | 414/462 |
| 3,529,737 | 9/1970 | Daugherty | 414/462 |
| 3,877,622 | 4/1975 | McLain | 211/17 |
| 3,901,421 | 8/1975 | Kalicki et al. | 224/42.03 B |
| 4,039,106 | 8/1977 | Graber | 224/329 |
| 4,085,874 | 4/1978 | Graber | 224/321 |
| 4,182,467 | 1/1980 | Graber | 224/309 |
| 4,189,274 | 2/1980 | Shaffer | 414/462 |
| 4,193,526 | 3/1980 | Rosmarinofski | 414/462 |
| 4,213,729 | 7/1980 | Cowles et al. | 414/462 |
| 4,318,501 | 3/1982 | Graber | 224/42.03 R |
| 4,345,705 | 8/1982 | Graber | 224/42.03 R |
| 4,364,498 | 12/1982 | Kuus et al. | 224/314 |
| 4,394,948 | 7/1983 | Graber | 224/314 |
| 4,403,716 | 9/1983 | Carlson et al. | 224/42.03 B |
| 4,513,897 | 4/1985 | Graber | 224/314 |

FOREIGN PATENT DOCUMENTS

| | | | |
|---|---|---|---|
| 970728 | 7/1975 | Canada | 414/462 |
| 3235248 | 3/1984 | Fed. Rep. of Germany | 224/42.03 B |
| 1127765 | 12/1956 | France | 211/17 |
| 2430873 | 3/1980 | France | 224/321 |
| 79334 | 11/1951 | Netherlands | 224/42.08 |
| 79713 | 2/1952 | Netherlands | 224/42.08 |
| 8402676 | 4/1986 | Netherlands | 224/310 |
| 104714 | 9/1942 | Sweden | 224/42.03 B |
| 138042 | 11/1952 | Sweden | 224/42.07 |
| 30356 | of 1897 | United Kingdom | 211/22 |
| 18443 | of 1911 | United Kingdom | 211/21 |

*Primary Examiner*—Henry J. Recla
*Assistant Examiner*—J. Casimer Jacyna
*Attorney, Agent, or Firm*—Vernon J. Pillote

[57] ABSTRACT

A foldable bicycle carrier comprising a main frame adapted to be mounted on the rear of a vehicle, an auxiliary frame mounted for movement between an upright position alongside the main frame and an erected position extending rearwardly of the main frame, and a pair of bicycle support frames mounted on the auxiliary frame for pivotal movement between a folded position extending inwardly of the auxiliary frame and an erected position extending outwardly of the auxiliary frame. Bicycle wheel receiving channels are provided on the bicycle support frames for receiving and supporting the bicycle wheels and a bicycle support arm is mounted on the main frame for movement between a folded position alongside the main frame and an erected position extending rearwardly from the main frame for engagement with the bicycle.

16 Claims, 4 Drawing Sheets

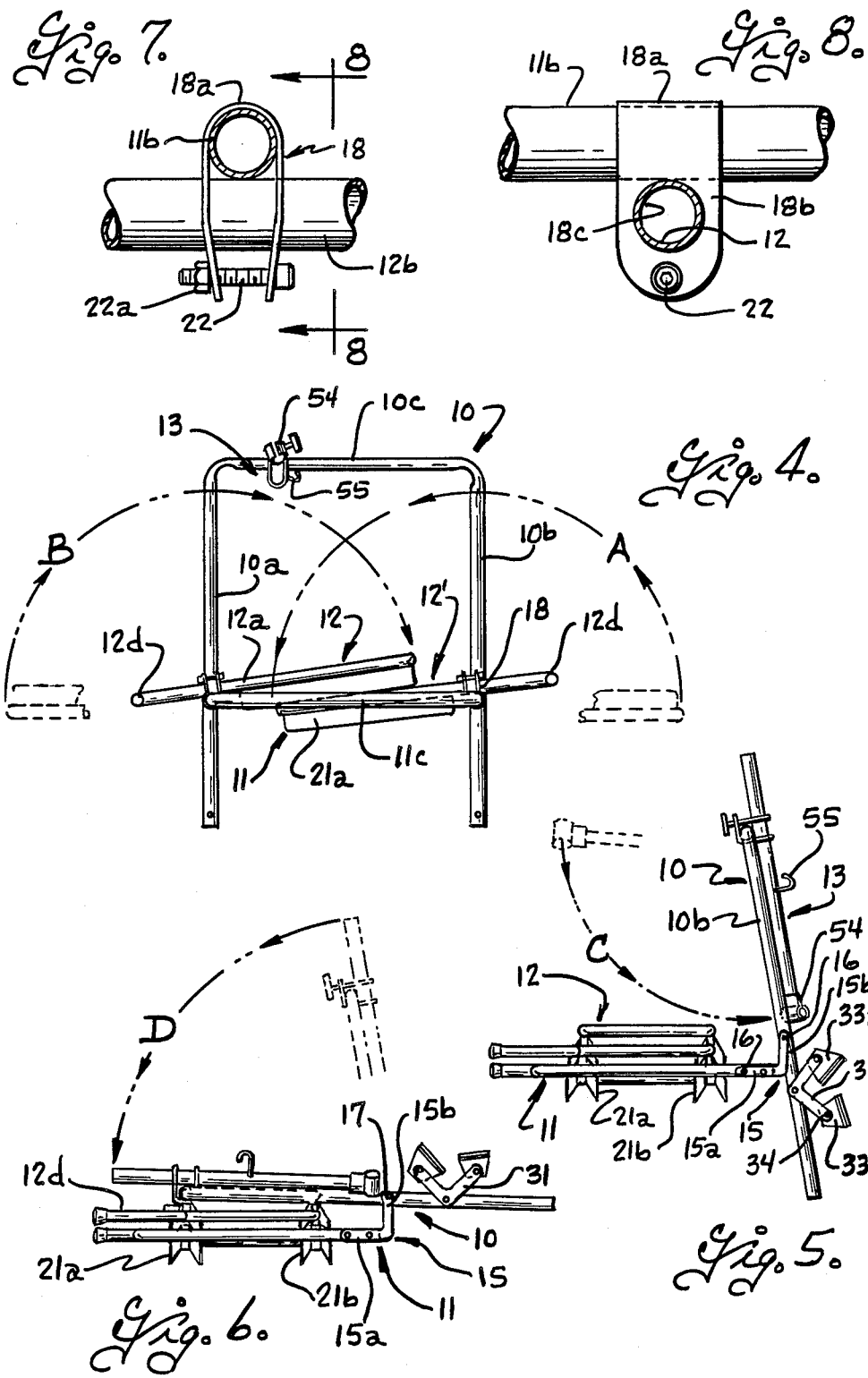

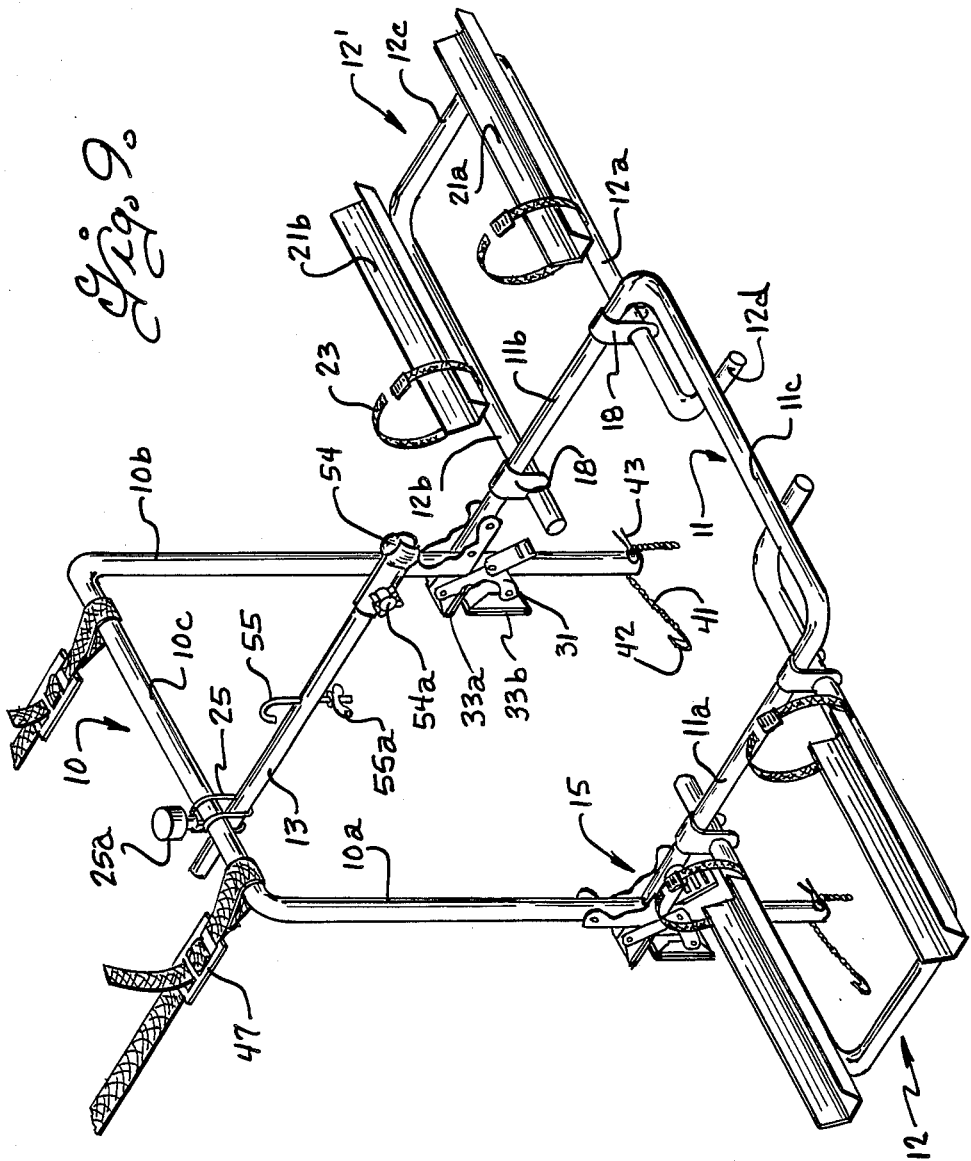

VEHICLE MOUNTED FOLDABLE BICYCLE CARRIER

Various different bicycle carriers have heretofore been made for mounting bicycles on the rear of a vehicle. Some bicycle carriers such as disclosed in U.S. Pats. Nos. 4,039,106 and 4,345,705 mount the bicycles on the roof or deck lid of the vehicle with the wheels of the bicycle disposed in a wheel receiving channel extending lengthwise of the vehicle. Some problem, however, is presented in lifting and mounting bicycles on such roof and deck lid carriers, and some people may lack the physical strength to do so. Some other bicycle carriers are arranged to support the bicycles at the rear of the vehicle with the bicycles extending crosswise of the vehicle, either on the deck lid as disclosed in U.S. Pats. Nos. 4,085,874; 4,182,467; 4,394,948 and 4,513,897, or on the bumper as disclosed in U.S. Pat. No. 4,318,501. The carriers disclosed in these patents, however, are arranged to support the bicycles only by engagement with the bicycle frame and some problems are encountered in preventing the bicycles from swaying and rubbing against each other and against parts of the vehicle. U.S. Pats. Nos. 3,251,520; 3,348,713; 3,528,578 and 4,189,274 disclose carriers which support the wheels of a bicycle or motorcycle in a channel at the rear of a vehicle, and the channel is mounted for tilting movement about an axis either longitudinally of a vehicle or crosswise of the vehicle, to facilitate rolling of the motorcycle or bicycle into the channel. These carriers, however, cannot be folded for compact storage on or off the vehicle. U.S. Pat. No. 4,213,729 discloses a vehicle attached carrier having wheel receiving frames for receiving the wheels of a wheel chair and which frames are tiltable about an axis longitudinally of the vehicle to facilitate loading of the wheel chair into the wheel receiving frames, and in which the wheel receiving frames are also swingable about an axis crosswise of the vehicle to a folded condition to reduce the rearward projection of the carrier when mounted on the vehicle.

SUMMARY OF THE INVENTION

It is an object of the present invention to provide a bicycle carrier for supporting bicycles at the rear of a vehicle, which support the bicycles by engaging the bicycle wheel and which is foldable both transversely and longitudinally of the vehicle to minimize the projection of the carrier from the vehicle when it is not in use to transport bicycles, and which also can be compactly stored when off the vehicle.

Accordingly, the present invention provides a foldable bicycle carrier comprising a generally upright main frame adapted for mounting on a vehicle at the rear end thereof, an auxiliary frame including first and second spaced side members each having one end swingably mounted on the main frame for movement about a horizontal axis between a folded position extending upwardly from the one end and an erected position extending rearwardly from the one end, and first and second bicycle support frames respectively pivotally attached to the first and second side members for movement about an axis generally paralleling the associated side member between a folded position in which the first and second bicycle support frames extend from the associated side member in a direction toward the other side member and an erected position in which the first and second bicycle support frames extend from the associated side member in a direction away from the other side member. Bicycle wheel engaging means are provided on the first and second bicycle support frames for supportably receiving the wheels of the bicycle when the first and second bicycle support frames are in their erected position, and a bicycle stabilizer arm is mounted on the main frame for engaging a bicycle at a location above the wheel engaging means.

The bicycle carrier, when installed and erected on a vehicle, is adapted to support one or two bicycles at the rear of a vehicle, with the bicycle wheels resting in wheel receiving means to provide a stable support for the bicycles. When not used for transporting bicycles, the bicycle support frames can be folded inwardly relative to the auxiliary frame, and the auxiliary frame with the infolded bicycle support frames, then folded upwardly to extend alongside the main frame, to minimize the lateral and rearward projection of the carrier from the vehicle when the carrier is not in use. The foldable carrier can also be fully assembled and compactly packaged for transportation in a folded condition.

BRIEF DESCRIPTION OF THE DRAWINGS

FIG. 4 is a rear elevational view showing the carrier with the bicycle support frames in a folded condition;

FIG. 5 is an end elevational view of the carrier showing the bicycle support frames in a folded condition;

FIG. 6 is an end elevational view showing the bicycle support frames in a folded condition and the auxiliary frame folded to extend alongside the main frame;

FIG. 7 is a fragmentary sectional view taken on the plane 7—7 of FIG. 3 and illustrating parts on a larger scale;

FIG. 8 is a fragmentary sectional view taken on the plane 8—8 of FIG. 7;

FIG. 9 is a perspective view of the carrier in an erected condition.

The foldable bicycle carrier is adapted for mounting at the rear of a vehicle and is advantageously constructed and arranged for mounting on the rear bumper of the vehicle, to support bicycles in a generally upright condition at the rear of the vehicle. The bicycle carrier in general includes a main frame 10 having means for mounting the same on the rear of a vehicle; an auxiliary frame 11 that is swingably mounted on the main frame for movement between a folded condition extending upwardly alongside the main frame, and an erected position extending rearwardly from the main frame; and a pair of bicycle support frames 12 and 12' that are swingably mounted on the auxiliary frame for movement relative thereto about generally parallel axes between a folded condition in which the bicycle support frames extend inwardly toward each other, and an erected condition in which the bicycle support frames extend in relatively opposite directions from the auxiliary frame. A bicycle support arm 13 is mounted on the main frame and is foldable relative thereto between a folded position in which it is disposed adjacent the main frame, and an erected position in which it extends rearwardly from the main frame at a level above the bicycle support frames, when the latter are in an erected position.

Figure 1:
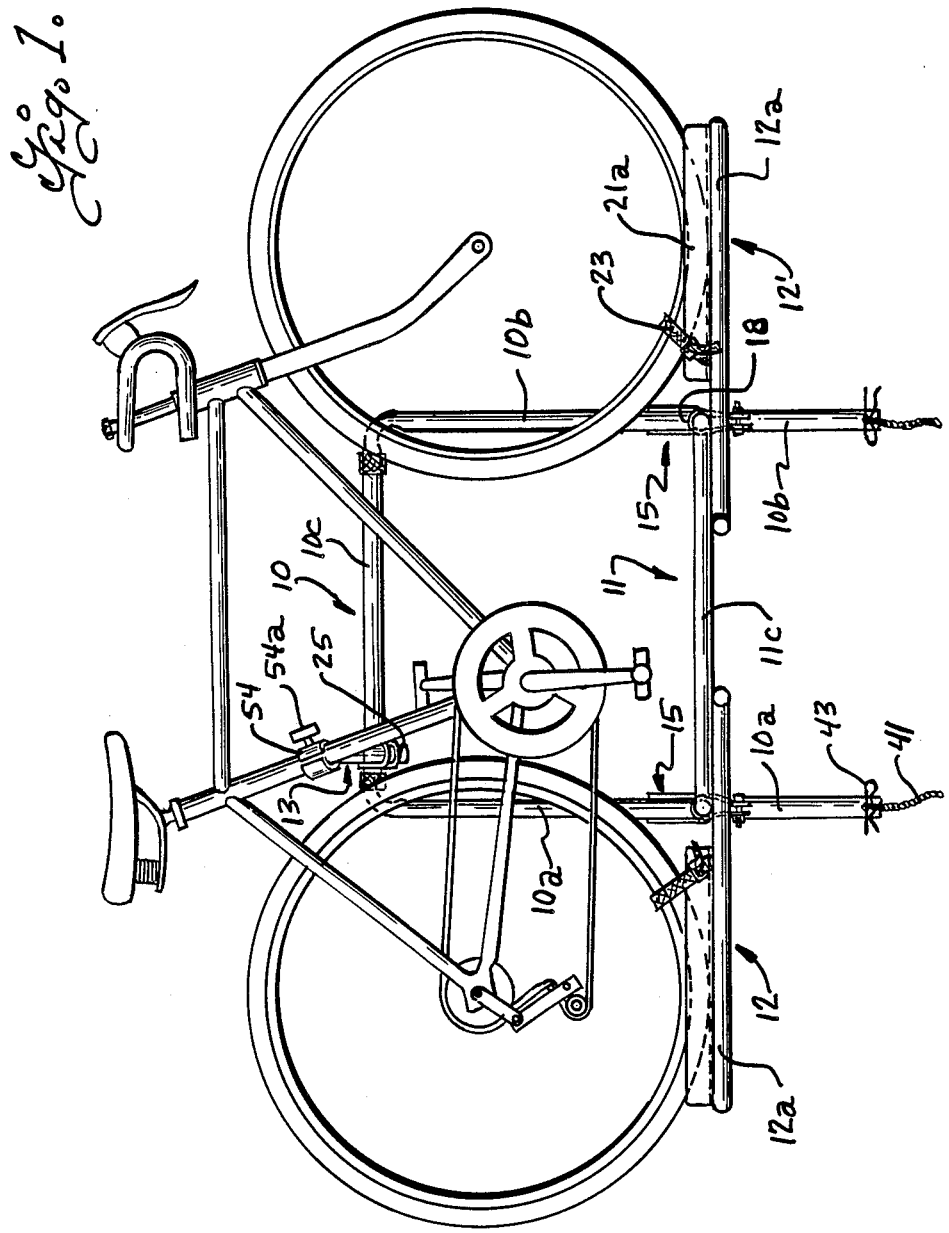
FIG. 1 is a rear elevational view of the carrier shown in an erected condition with a bicycle supported thereon.
Figure 2:
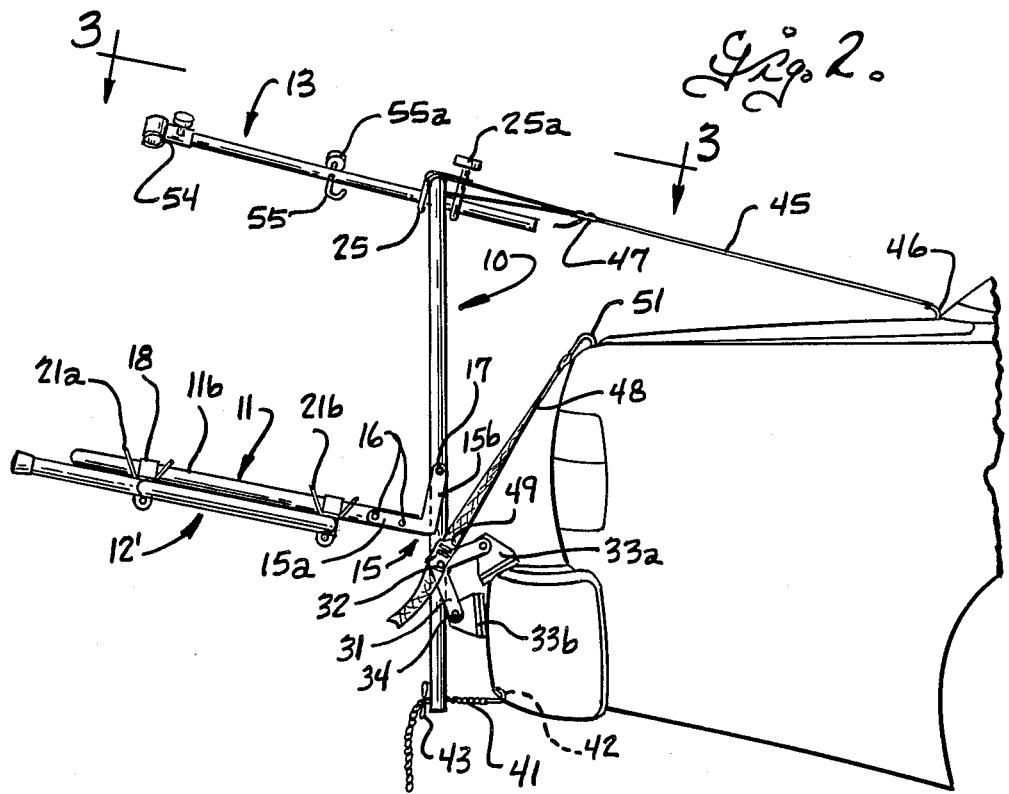
FIG. 2 is a side elevational view of the carrier shown in an erected condition and mounted on the rear of a vehicle.
Figure 3:
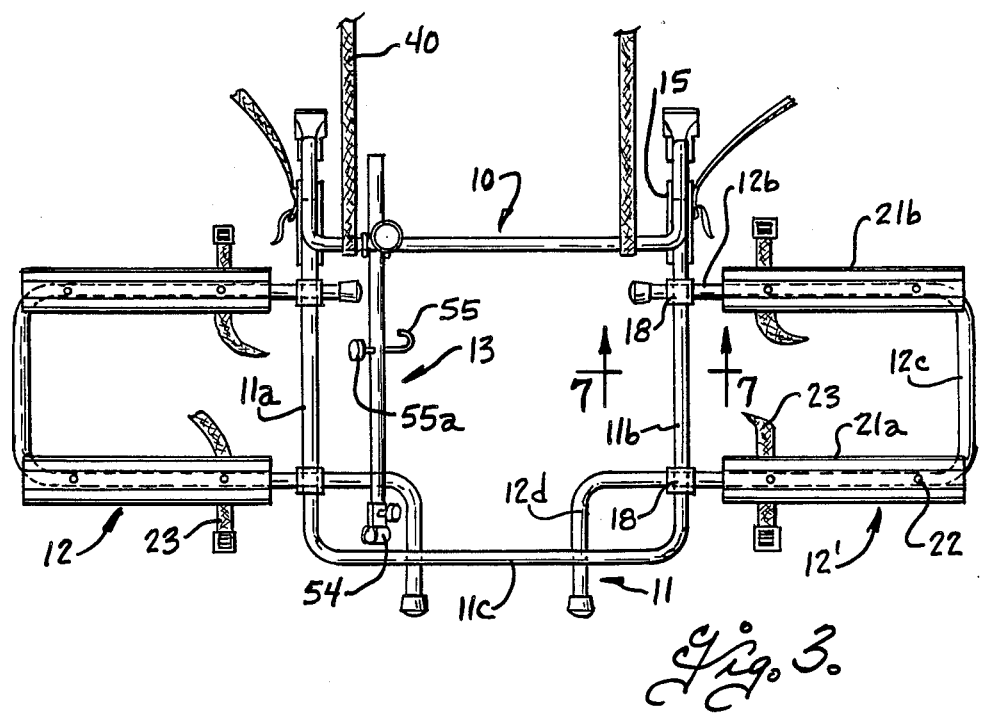
FIG. 3 is a top plan view of the carrier illustrated in an erected condition.

The main frame 10 is preferably formed of tubular metal bent into a generally U-shaped configuration and having spaced main legs 10a and 10b, and a main cross member 10c rigidly interconnecting the upper ends of the main legs. The auxiliary frame 11 is also preferably formed of tubular metal bent into a generally U-shaped configuration and having laterally spaced auxiliary legs 11a and 11b that are rigidly connected at one end by an auxiliary cross member 11c. The legs 11a and 11b of the auxiliary frame are spaced apart a distance approximately the same as the spacing between the main legs 10a and 10b of the main frame, and the ends of the legs 11a and 11b of the auxiliary frame are pivotally attached to the legs of the main frame intermediate the ends of the latter, by pivot brackets 15. As best shown in FIGS. 2, 5 and 6, the pivot brackets 15 are advantageously in the form of L-shaped hinge members having one leg 15a rigidly secured as by spaced rivets 16 to a respective one of the auxiliary legs, and a second leg 15b that is pivotally attached as by a single rivet 17, to a respective one of the main legs. The pivot brackets are constructed and arranged so that the ends of the auxiliary legs on the auxiliary frame abut against the associated main leg on the main frame when the auxiliary frame is in an erected position as shown in FIGS. 1–3, and the auxiliary legs extend alongside the associated main leg when the auxiliary frame is in a folded condition as shown in FIG. 6.

The bicycle support frames 12 and 12' are of like construction and like numerals are used to designate corresponding parts. The bicycle support frames are preferably formed of a metal tube bent to a generally U-shaped configuration to have spaced support legs 12a and 12b that are rigidly interconnected at one end by a support frame cross member 12c. The support legs 12a and 12b of each bicycle support frame are pivotally mounted on a respective one of the auxiliary legs 11a and 11b for swinging movement about an axis generally paralleling the associated auxiliary leg. In the preferred embodiment illustrated, the support legs 12a and 12b are each connected by a pivot bracket 18 to the respective auxiliary leg, for movement between a folded position in which the support frames extend inwardly from the associated auxiliary leg toward the other auxiliary leg, as shown in FIG. 4, and an erected position in which the support frames extend outwardly from the associated auxiliary leg in a direction away from the other auxiliary leg, as best shown in FIGS. 1 and 3. Means are provided for supporting the support frames in their erected position and, as best shown in FIGS. 1 and 2, one of the support legs 12a of each of the support frames 12 and 12' is provided with an integral laterally extending arm 12d that is arranged to underlie and engage the auxiliary cross member 11c, when the auxiliary frames are in their erected position.

The pivot brackets 18 are advantageously in the form of a metal strap having a bight portion 18a that overlies a respective auxiliary leg and which has depending leg portions 18b with openings 18c therethrough for receiving a respective one of the support legs such as 12b, as best shown in FIGS. 7 and 8. The openings 18c are dimensioned to allow slidable adjustment of the associated support leg relative to the leg portions 11b in a direction crosswise of the auxiliary leg, and a threaded fastener comprising a headed bolt 22 and a nut 22a extends through bolt openings (not shown) in the leg portions 18b at a location remote from the bight portion 18a, to draw the leg portions 18b of the hinge bracket toward each other as shown in FIG. 7 and thereby tilt or incline the web portions relative to the associated support leg. Drawing of the leg portions 18b of the pivot bracket 18 toward each other, clamps the associated auxiliary leg against endwise movement relative to the pivot bracket, but yet allows the support leg to pivot or swing about the axis of the associated auxiliary leg. The bicycle support frames can thus be adjusted in a direction crosswise of the associated auxiliary leg and then clamped in the adjusted position, and the support frames thereafter pivoted relative to the associated auxiliary leg between the folded and erected positions.

Bicycle wheel engaging means are provided on the bicycle support frames for receiving the wheels of a bicycle. The bicycle wheel receiving means are preferably formed of upwardly opening U-shaped channel members designated 21a and 21b mounted as by rivets 22 (FIG. 3) on the support legs 12a and 12b respectively of each bicycle support frame. The channels are arranged to open upwardly when the support frames are in their erected position shown in FIGS. 1–3 and a means such as a strap 23 is advantageously provided on each wheel receiving member at the end thereof adjacent the auxiliary frame, for encircling and securing the wheel of a bicycle to the wheel receiving member, as shown in FIG. 1.

The bicycle support arm 13 is mounted on the main cross member 10c of the main frame for movement between a folded position as shown in FIGS. 5 and 6 and an erected position as shown in FIGS. 1–4. The bicycle support arm is conveniently in the form of a tube that is attached by a wire clamp 25 to the main cross member 10c in a manner to enable adjustment of the support arm in a direction crosswise of the cross member 10c and also locking of the support arm in an angularly adjusted position. The clamp 25 has portions that overlie the main cross member 10c and underlie the transversely extending arm, with a means such as a knob 25a provided for tightening the clamp, to hold the arm in a lengthwise and angularly adjusted position relative to the main cross member.

The carrier is preferably constructed and arranged to be supported on the rear bumper of a vehicle, to minimize possible damage to the vehicle body or paint finish. In the preferred embodiment illustrated, the bumper mounting arrangement is of the type disclosed and claimed in the co-pending application of John W. Graber, Ser. No. 07/206,422, filed June 14, 1988. In general, the bumper mounting arrangement includes a pair of generally V-shaped pivot brackets 31 that are pivotally mounted by a pivot pin or rivet 32 on opposite sides of each of the main legs, and with upper and lower vehicle engaging feet 33a, 33b pivotally attached by pivot pins or rivets 34 to the pivot bracket for movement about axes paralleling the pivot pin 32. The feet 33a, 33b have vehicle engaging faces disposed parallel to the pivot axes 34, and are arranged to pivot relative to the brackets 31 to conform to the contour of the portion of the bumper engaged thereby. The main legs 10a, 10b of the main frame can pivot about the pivot pins 32 relative to the brackets 31 to enable the legs to be disposed in a generally upright position. A lower vehicle attaching device such as a flexible chain 41 extends through openings in the lower portion of the main legs and has a vehicle engaging hook 42 at one end for engaging a portion of the vehicle such as the lower edge of a bumper or a part on the underside of the vehicle body. The chain can be pulled through the openings in the associated main leg and a clip 43 (FIGS. 1 & 2) is provided for anchoring the chain in a tensioned condition. Upper flexible and length adjustable tie straps 45 are connected to the main cross member 10c and have upper vehicle engaging hooks 46 at one end and a strap adjusting buckle 47, to draw the upper portion of the main frame toward an upright position. Intermediate flexible and adjustable anchor straps 48 are advantageously connected by a bracket 49 to each pivot bracket 31 at or adjacent the location of the pivot pin 32, and the straps 48 have intermediate vehicle engaging hooks 51 for engagement with the body of the vehicle at a location above the bumper. The intermediate straps 48 are adjusted to a taut condition when the vehicle engaging feet 33a and 33b are in the desired support position on the vehicle bumper. The main frame 10 can be pivoted about the pivot pins 32 relative to pivot brackets 31 and the lower anchor chains 41 and upper anchor straps 45 are adjusted to draw the main frame toward a generally upright position as shown in FIG. 2. Bicycle frame engaging clamps 54 and 55 are provided on the arm 13 for clampingly engaging the bicycle frame of a bicycle resting in channels 21a and 21b respectively. In the embodiment illustrated, clamp 54 is in the form of opposed clamp jaws mounted on the end of the arm 13 and adjustable relative to each other by a knob 54a. Clamp 55 is in the form of a J-bolt adjustable by a knob 55a.

From the foregoing it is thought that the construction and operation of the foldable carrier will be readily understood. The carrier is adapted for mounting on the rear of the vehicle and preferably on the rear bumper. When the carrier is mounted on the vehicle, the main frame is disposed in a generally upright position. The auxiliary frame is movable from a folded position extending upwardly alongside the main frame to an erected position extending rearwardly thereof, and the bicycle support frames are swingable relative to the auxiliary frame from a folded condition as shown in FIGS. 4-6 extending toward each other in overlapping relation inwardly of the auxiliary frame as shown in FIGS. 4-6, to an erected position extending laterally upwardly from the auxiliary frame as shown in FIGS. 1 and 2. The bicycle support arm 13 is swingable from a folded position extending alongside the main frame at the rear thereof as shown in FIG. 5, to an erected position extending rearwardly in overlying relation to the auxiliary frame and bicycle support frames. The wheel receiving channels on the bicycle support frames 12 and 12' are disposed in aligned pairs as shown in FIG. 3, and one bicycle is adapted to be mounted in each aligned pair of channels. The bicycle frame engaging clamps 54, 55 are provided on the bicycle support arm for engaging bicycles in either or both the aligned pairs of wheel receiving channels. The bicycle is thus firmly supported on its wheels in the wheel receiving channels and laterally and longitudinally stabilized by the bicycle support arm.

The bicycle support frames 12 and 12' can be folded inwardly to overlapping relation and the auxiliary frame then folded upwardly, while the carrier is mounted on a vehicle, to minimize the transverse and longitudinal projection of the carrier when it is not in use. Further, the foldable carrier is compact when folded to facilitate packaging, shipping and storage.

The embodiments of the invention in which an exclusive property or privilege is claimed are defined as follows:

1. A foldable bicycle carrier for mounting on a vehicle comprising, a generally upright main frame having means for mounting the main frame on a vehicle at a rear end thereof, an auxiliary frame including first and second spaced side members each having one end swingably mounted on the main frame for movement about a horizontal axis between a folded position extending upwardly from said one end alongside said main frame and an erected position extending rearwardly from said one end, first and second bicycle support means respectively pivotally attached to the first and second side members for movement about an axis generally paralleling the associated side member between a folded position in which the first and second bicycle support means extend from the associated side member in a direction toward the other side member into overlapping relation and an erected position in which the first and second bicycle support means extend generally horizontally from the associated side member in a direction away from the other side member, at least one bicycle wheel receiving channel on each of the first and second bicycle support means, said wheel receiving channels extending generally horizontally and opening upwardly for supportably receiving the wheels of a bicycle when the first and second bicycle support means are in said erected position, and bicycle stabilizer means mounted on the main frame for engaging a bicycle at a location above said bicycle wheel receiving channels.

2. A foldable bicycle carrier according to claim 1 wherein the bicycle stabilizer means includes a bicycle stabilizer arm mounted on said main frame for movement relative thereto between a folded position disposed alongside the main frame and an erected position extending rearwardly from the main frame above the auxiliary frame, and means on the stabilizer arm for engaging a bicycle supported on the wheel receiving channels at a location above the bicycle wheel receiving channels.

3. A foldable bicycle carrier according to claim 1 wherein said auxiliary frame has a cross member extending between and rigidly interconnecting the side members at a location spaced from said one end, said first and second bicycle support means each having means rigid therewith for engaging said cross member to support the bicycle support means in said erected position thereof.

4. A foldable bicycle carrier according to claim 1 wherein said first and second bicycle support means each comprise a generally U-shaped support frame having leg portions extending transverse to the respective side members of the auxiliary frame, one of said bicycle wheel receiving channels being provided on each of the leg portions of the bicycle support frames.

5. A foldable bicycle carrier according to claim 4 wherein said bicycle stabilizer means includes a bicycle stabilizer arm mounted on said main frame for movement relative thereto between a folded position disposed alongside the main frame and an erected position extending rearwardly from the main frame above the auxiliary frame, and means on the stabilizer arm for engaging a bicycle supported on the wheel receiving channels at a location above the bicycle wheel receiving channels.

6. A foldable bicycle carrier for mounting on a vehicle comprising a generally upright main frame having a pair of laterally spaced main legs, means for mounting the main frame on a vehicle, an auxiliary frame having a pair of laterally spaced auxiliary legs each mounted at one end on a respective one of the main legs for swinging movement above a horizontal axis between a folded position extending upwardly from said one end alongside the respective main leg and an erected position extending generally horizontally transverse to the respective main leg, first and second bicycle support frames pivotally attached to a respective one of the auxiliary legs for movement about an axis generally paralleling the respective auxiliary leg between a folded position in which the first and second bicycle support frames extend from the associated auxiliary leg in a direction toward the other auxiliary leg into overlapping relation and an erected position in which the first and second bicycle support frames extend generally horizontally from the associated auxiliary leg in a direction away from the other auxiliary leg at least one bicycle wheel receiving channel on each of the first and second bicycle support frames, said bicycle wheel receiving channels extending generally horizontally and opening upwardly for supportably receiving the wheels of a bicycle when the first and second bicycle support frames are in said erected position, and bicycle stabilizer means mounted on the main frame for engaging a bicycle at a location above the bicycle wheel receiving channels.

7. A foldable bicycle carrier according to claim 6 wherein said first and second bicycle support frames each have a U-shaped configuration with spaced support legs, one of said bicycle wheel receiving channels being provided on each support leg.

8. A vehicle attached carrier according to claim 6 wherein the bicycle stabilizer means includes a bicycle stabilizer arm mounted on said main frames for movement between a folded position intermediate said main legs on an erected position overlying said auxiliary frame when the latter is in its erected position.

9. A foldable bicycle carrier according to claim 6 wherein said main frame includes a main cross member extending between the upper ends of said main legs, said bicycle stabilizer means including a bicycle stabilizer arm swingably mounted on said main cross member for movement between a folded position intermediate said main legs and an erected position overlying said auxiliary frame when the latter is in its erected position.

10. A foldable bicycle carrier according to claim 6 wherein said auxiliary frame has a U-shaped configuration with an auxiliary cross member extending between the auxiliary legs, and means on said first and second bicycle support frames for engaging said auxiliary cross member to support the bicycle support frames in the erected positions thereof.

11. A foldable bicycle carrier according to claim 6 wherein said auxiliary frame has a U-shaped configuration with an auxiliary cross member extending between the auxiliary legs, said first and second bicycle support frames each having a U-shaped configuration with a pair of support legs each pivotally mounted adjacent one end on a respective one of the auxiliary support legs and cross member extending between the other ends of support legs, one of said wheel receiving channels being mounted on each support leg of said first and second bicycle support frames, and one of said support legs having an arm rigid therewith and engageable with said auxiliary cross member for supporting the respective auxiliary support frame in the erected position thereof.

12. A foldable bicycle carrier for mounting on a vehicle comprising a generally upright tubular main frame of generally U-shaped configuration having a pair of laterally spaced main legs and a main cross member rigidly interconnecting the one end of main legs, means for mounting the main frame on a vehicle, a tubular auxiliary frame of generally U-shaped configuration having a pair of laterally spaced auxiliary legs and an auxiliary cross member rigidly interconnecting one end of the auxiliary legs, auxiliary frame pivot means pivotally mounting one end of the auxiliary legs on a respective one of the main legs to support the auxiliary frame for swinging movement from a folded position extending upwardly from the auxiliary frame pivot means alongside the main frame and an erected position extending transverse to the main frame, first and second tubular bicycle support frames each of generally U-shaped configuration and each having a pair of support legs and a support frame cross member rigidly interconnecting one end of the support legs, first and second pivot means respectively mounting the support legs of the first and second bicycle support frames on a respective one of the auxiliary legs for movement about axes generally paralleling the respective auxiliary leg to support the first and second bicycle support frames for movement between a folded condition in which the first and second support frames extend from the associated auxiliary leg toward the other auxiliary leg into overlapping relation and an erected position in which the first and second bicycle support frames extend generally horizontally from the associated auxiliary leg in a direction away from the other auxiliary leg, means rigid with the first and second bicycle support frames for engaging the auxiliary cross member to support the support frames in the erected positions thereof, a bicycle wheel receiving channel on each of the support legs of the first and second bicycle support frames, and a bicycle stabilizer arm mounted on the main cross member for movement between a folded position between the main legs and an erected position extending transverse to the main frame.

13. A foldable bicycle carrier according to claim 12 wherein the auxiliary legs are laterally spaced apart a distance approximately the same as the lateral spacing of the main legs, the auxiliary frame pivot means comprising at least one L-shaped pivot bracket individual to each main leg, each L-shaped pivot bracket having one leg pivotally attached to a respective one of the main legs and a second leg rigidly attached to a respective one of the auxiliary legs such that an end of each auxiliary leg abuts the associated main leg intermediate its ends of the latter when the auxiliary frame is in the erected position thereof.

14. A foldable bicycle carrier according to claim 12 wherein said first pivot means and second pivot means include a plurality of generally U-shaped straps each individual to one support leg of the associated first and second bicycle support frames, the U-shaped straps each having a bight portion overlying the respective auxiliary leg and depending leg portions with openings therethrough for adjustably receiving a respective one of the support legs, and a threadedly adjustable fastener means extending between the leg portions of each U-shaped strap for drawing the leg portions of each strap toward each other to grip the associated support leg while allowing pivotal movement of the support leg relative to the associated auxiliary leg.

15. A foldable bicycle carrier according to claim 12 wherein the means for mounting the main frame on a vehicle includes vehicle bumper engaging means mounted on each main leg intermediate the ends thereof.

16. A foldable bicycle carrier according to claim 12 including first and second bumper engaging foot assemblies for supporting the main legs at locations spaced above their lower ends on a vehicle bumper with the main legs extending generally upright crosswise of the vehicle bumper, the first and second bumper engaging foot assemblies each including:

(a) pivot bracket means pivotally mounted on each of the main legs at a location spaced above the lower ends thereof for pivotal movement about a horizontal bracket pivot axis transverse to the associated main leg, each pivot bracket means having upper and lower leg portions extending in relatively diverging relation from the bracket pivot axis forwardly of the associated main leg, (b) upper and lower foot members each having a bumper engaging face at one side and means defining a foot pivot axis at a side opposite said one side, upper and lower foot pivot means respectively pivotally mounting the upper and lower foot members on the upper and lower leg portions of each pivot bracket means with the foot pivot axes disposed in a plane generally parallel to and offset from the bracket pivot axis of the associated pivot bracket means, the upper and lower foot members being disposed forwardly of the associated main leg respectively above and below the bracket pivot axis, the main legs each having lower portions extending downwardly from the bracket pivot axis to a level below the associated lower foot member and upper portions extending upwardly from the associated bracket pivot axis to a level above the associated upper foot member, a lower flexible tie means attached to each main leg at a location spaced below the associated pivot bracket means and having lower vehicle engaging hook means at one end, the lower flexible tie means being adjustable to vary the distance between the lower vehicle engaging hook means and the lower portions of the associated main leg, upper flexible tie means attached to the main frame at a location above said bracket pivot axes and having upper vehicle engaging hook means thereon, the upper flexible tie means being adjustable to vary the distance between the upper vehicle engaging hook means and the main frame, the pivot bracket means supporting the upper and lower foot members for movement in opposite directions relative to the front side of the associated rack leg means and the upper and lower foot members of each bumper engaging bracket assembly being pivotally movable about the respective upper and lower foot pivot axis relative to the associated pivot bracket means to conform the vehicle engaging faces to the contour of the outer face of a vehicle bumper for supporting the bicycle carrier thereon, the upper and lower flexible tie means being adjustable, when the carrier is mounted on the vehicle bumper, to draw the main legs toward a generally upright position and press the bumper engaging foot assemblies against the outer face of the bumper.

* * * * *